(12) United States Patent
Hass et al.

(10) Patent No.: US 7,937,711 B2
(45) Date of Patent: May 3, 2011

(54) METHOD AND APPARATUS FOR PROVIDING A CONSOLIDATED NAMESPACE TO CLIENT APPLICATIONS IN MULTI-TENANT COMMON INFORMATION MODEL (CIM) ENVIRONMENTS

(75) Inventors: Jon Robert Hass, Austin, TX (US); RadhaKrishna Reddy Dasari, Round Rock, TX (US); Javier Luis Jimenez, Austin, TX (US); Khachatur Papanyan, Austin, TX (US); Jianwen Yin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1342 days.

(21) Appl. No.: 11/479,491

(22) Filed: Jun. 30, 2006

(65) Prior Publication Data

US 2008/0005305 A1    Jan. 3, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/316; 709/226
(58) Field of Classification Search .................. 719/316; 709/226
See application file for complete search history.

(56) References Cited

U.S. PATENT DOCUMENTS

| | | | |
|---|---|---|---|
| 6,317,748 B1 | 11/2001 | Menzies et al. | 707/103 X |
| 6,854,122 B1 | 2/2005 | Sheriff et al. | 719/316 |
| 6,862,736 B2 * | 3/2005 | Hudis et al. | 719/316 |
| 6,971,090 B1 | 11/2005 | Gruttadauria et al. | 717/136 |
| 7,143,156 B2 | 11/2006 | Menzies et al. | 709/223 |
| 7,159,125 B2 | 1/2007 | Beadles et al. | 713/193 |
| 7,287,037 B2 | 10/2007 | An et al. | 707/102 |
| 7,290,049 B2 * | 10/2007 | Menzies et al. | 709/223 |
| 2002/0107872 A1 | 8/2002 | Hudis et al. | 707/104.1 |
| 2003/0135657 A1 | 7/2003 | Barker et al. | 709/310 |
| 2003/0217195 A1 | 11/2003 | Mandal et al. | 709/330 |
| 2004/0015889 A1 | 1/2004 | Todd et al. | 717/137 |
| 2004/0025142 A1 | 2/2004 | Mandal et al. | 707/104 |

(Continued)

FOREIGN PATENT DOCUMENTS

EP     1061446 A2    12/2000

OTHER PUBLICATIONS

Patents Act 1977 Examination Report 18(3), Application No. GB 0705416.6, 1 page, May 30, 2008.
www.dmtf.org/standards/cim, Common Information Model Standards, 2007.

(Continued)

*Primary Examiner* — Diem K Cao
(74) *Attorney, Agent, or Firm* — Baker Botts L.L.P.

(57) ABSTRACT

An information handling system includes a processor, system memory, and a storage medium. The storage medium includes an object manager that is accessible to a client management application. The object manager includes first and second sets of class instances instantiated in first and second vendor namespaces, respectively. An uber set of class instances is instantiated in an uber namespace. A class instance in the uber set of class instances is associated with a vendor namespace class instance in one of the first or second sets of class instances. An uber provider instantiates objects in the uber namespace. The uber provider services a client management application request by indicating an action and a class including identifying instances of the class in the first and second vendor namespaces and causing the action to be performed with respect to the identified class instances.

11 Claims, 5 Drawing Sheets

U.S. PATENT DOCUMENTS

| | | | |
|---|---|---|---|
| 2005/0050056 A1 | 3/2005 | Idicula et al. | 707/100 |
| 2005/0071363 A1 | 3/2005 | Chen et al. | 707/102 |
| 2005/0108725 A1 | 5/2005 | Hudis et al. | 719/316 |
| 2005/0193109 A1 | 9/2005 | Hudis et al. | 709/223 |
| 2006/0026195 A1 | 2/2006 | Gu et al. | 707/102 |
| 2007/0226232 A1 | 9/2007 | Yin et al. | 707/100 |
| 2008/0178194 A1* | 7/2008 | Longobardi | 719/316 |

OTHER PUBLICATIONS

Patents Act 1977 Examination Report 18(3), Application No. GB 0705416.6, 2 pages, May 30, 2008.

Office Action for Chinese Patent Application No. 200710089459.3, 10 pages, Jun. 20, 2008.

Office Communication for Singapore Application No. 0702066-2, 6 pages, Jul. 21, 2008.

* cited by examiner

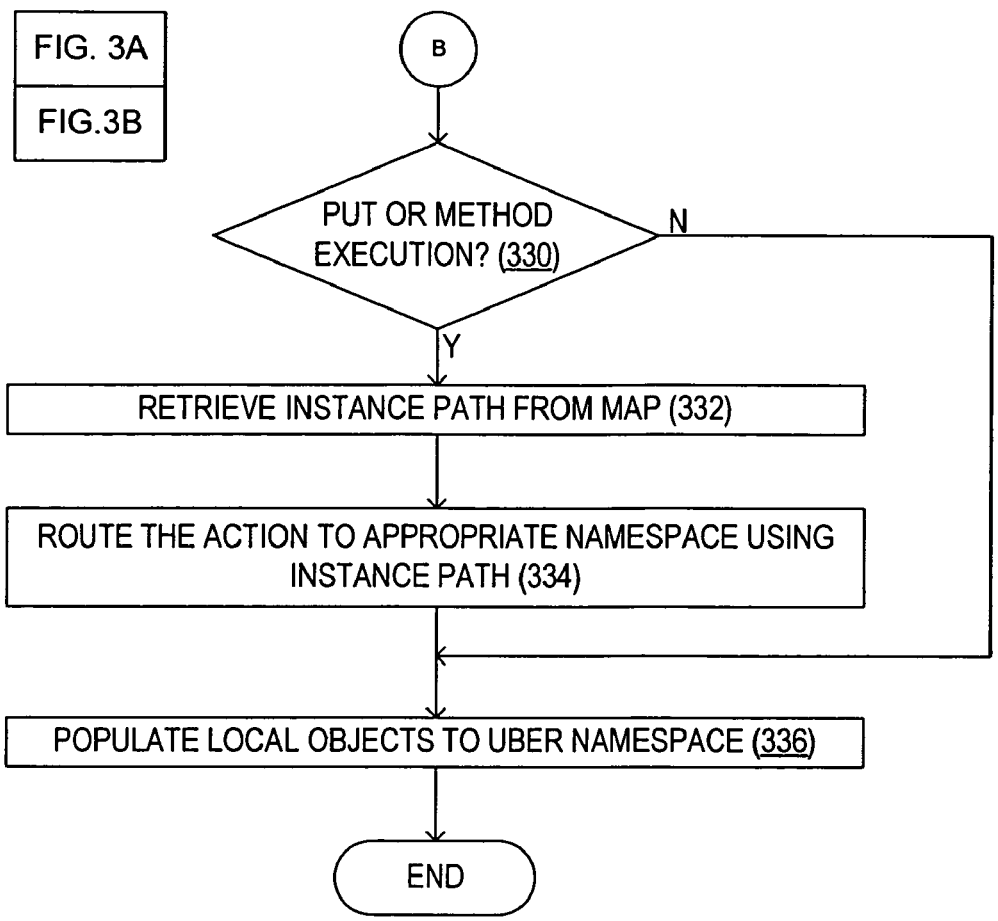

METHOD AND APPARATUS FOR PROVIDING A CONSOLIDATED NAMESPACE TO CLIENT APPLICATIONS IN MULTI-TENANT COMMON INFORMATION MODEL (CIM) ENVIRONMENTS

TECHNICAL FIELD

The present invention is related to the field of computer systems and more specifically to the management of computer systems and, even more specifically, the management of computer systems in compliance with the Common Information Model.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a server, which is a processor-based network device that manages network resources. As examples, a file server is dedicated to storing files, a print server manages one or more printers, a network server manages network traffic, and a database server processes database queries.

The total cost of ownership associated with information handling systems generally and server systems particularly is affected by a system's management resources. In general, system management resources refer to software, hardware, and/or firmware that enable remote or automated execution of administrative tasks such as powering on, powering off, updating firmware, deploying applications, monitoring status, monitoring alerts, and so forth. The cost saving implications of systems management resources have generated a great deal of industry interest and effort in recent years.

One aspect of the systems management effort concerns standardization and, more specifically, providing a complete and standardized model of an information handling system to which all vendors and developers could adhere in the design of systems management resources and applications. The Common Information Model (CIM) is a product of this effort from the Distributed Management Task Force (DMTF). Because CIM has been adopted by many large vendors of systems, software, and management services, CIM is the most pervasive system management standard.

The DMTF describes CIM as a conceptual information model for describing management that is not bound to a particular implementation. CIM allows for the interchange of management information between management systems and applications. CIM attempts to define and organize common and consistent semantics for networking and computing equipment, and services. CIM data organization is object-oriented, supporting the concepts of inheritance, relationships, abstraction, and encapsulation to improve the quality and consistency of management data.

CIM encompasses a CIM Infrastructure Specification (also referred to simply as the CIM Specification) and a CIM Schema. Both are published electronically on the DTMF web site (http://www.dmtf.org/standards/cim) and are incorporated by reference herein. The CIM Infrastructure Specification includes a formal definition of the model and describes the language, naming, and mapping techniques to other management models such as SNMP MIBs, and DMTF MIFs etc.

The CIM Schema provides the actual model descriptions. The CIM Schema supplies a set of classes with properties and associations that provide a well-understood conceptual framework within which it is possible to organize the available information about a managed environment. The formal definition of the CIM Schema is expressed in a Managed Object File (MOF) which is an ASCII or UNICODE file that can be used as input into a MOF editor, parser, or compiler for use in an application.

The CIM Schema includes three layers, namely, the Core Schema, the Common Schema, and the Extension Schema. The Core Schema is an information model that captures notions that are applicable to all areas of management. Common Schemas are information models that capture notions that are common to particular management areas, but independent of a particular technology or implementation. Examples of common areas are systems, devices, networks, applications, and so forth. Models for these common areas define classes addressing each of the management areas in a vendor-neutral manner. Extension Schemas, in contrast, represent organizational or vendor-specific extensions of the Common Schema. Extension Schemas can be specific to environments, such as operating systems (for example, UNIX® or Microsoft Windows®).

A CIM profile, which may be specified in documents published by the DMTF or in specifications created by other organizations, defines the CIM model and associated behavior for a particular management domain implementation (including the CIM classes, associations, indications, methods and properties). A profile provides a unified way of describing the management domain in CIM.

The CIM standard schema is designed to cover every aspect of managing a computer system including hardware devices, peripherals, drivers, event indications, services, and their relationships. The CIM standard schema defines thousands of classes and associations for logical and physical modeling. A profile is a specification that defines the CIM model and associated behavior for a management domain. Profiles are typically implemented by different providers using multiple namespaces within a CIM Object Manager (CIMOM).

Instances of CIM classes are organized into namespaces. Namespaces are the partitioning mechanism employed by the CIMOM to control the scope and visibility of managed resource class definitions and instantiations. Each namespace in the CIMOM contains a logical group of related classes representing a specific technology or area of management. All classes within a namespace must have a unique class name, and classes in one namespace cannot be derived from classes in another namespace.

Vendors of various devices are free to implement their own namespaces and corresponding CIM providers. A system's CIMOM implementation may include multiple vendor namespaces. Because, however, CIM based application actions cannot act on objects in multiple namespaces simultaneously or without apriori knowledge on the part of the management application, multiple vendor namespace implementations present challenges for developers of client management applications.

SUMMARY OF THE INVENTION

Therefore a need has arisen for a system and method for managing CIM objects in a multiple namespace environment. The present disclosure describes a system and method for implementing a consolidating namespace in a multiple namespace environment. The consolidating namespace hides the details of the multiple vendors namespace implementations from the client management application so that the client management application is able to interact exclusively with a single namespace.

In one aspect, a disclosed information handling system includes a processor, system memory, and a storage medium. The storage medium includes computer executable code including an object manager, accessible to a client management application. The object manager includes a first set of class instances instantiated in a first vendor namespace, a second set of class instances instantiated in a second vendor namespace, and an uber set of class instances instantiated in an uber namespace. A class instance in the uber set of class instances is associated with a vendor namespace class instance in one of the first or second sets of class instances. An uber provider of the system code instantiates objects in the uber namespace. The uber provider services a client management application request that indicates an action and a class. Servicing the request includes identifying instances of the class in the first and second namespace and causing the action to be performed with respect to the identified class instances.

The object manager is preferably a common information model (CIM) compliant object manager. The uber provider may be operable to query an interop namespace to identify the first vendor namespace and the second vendor namespace. The uber provider may be operable to create a set of local objects and associate each local object with one of the identified instances of the class in the first and second namespaces. Causing the action to be performed may include populating the uber namespace with an instance corresponding to each local object in the set of local objects. The uber provider may also be operable to maintain a mapping between each local object and its associated class instance in the first or second namespace. If the action is a write action such as a put action or a method execution action, the uber provider may also cause the action to be performed by using the mapping to route the action to each of the associated class instances in the first and second vendor namespaces.

In another aspect a disclosed method of managing an information handling system includes detecting a request of a client management application where the request indicates an object and an action, identifying class instances corresponding to the object in a plurality of vendor namespaces including first and second vendor namespaces, and causing the action to be performed with respect to each of the identified class instances.

The object may be a CIM class and identifying may include identifying the first and second namespaces and querying the identified namespaces for instances of the class. Identifying the first and second namespaces may include querying an interop namespace for instances of a namespace class. Causing the action to be performed may includes creating a local object corresponding to each identified class instance. Identifying may also include populating an uber namespace with class instances corresponding to each of the local objects. The method may further include maintaining a mapping between each uber namespace class instance and its corresponding class instance in the first or second namespace. The action may a write action and causing the action to be performed may include using the mapping to route the action to each of the identified class instances in the first and second namespaces.

In yet another aspect a disclosed computer program product includes computer executable instructions, stored on a computer readable medium, for managing an information handling system. The instructions include at least one instruction for detecting a request of a client management application, where the request indicates an object and an action, at least one instruction for identifying in a first vendor namespace and a second vendor namespace class instances corresponding to the object, and at least one instruction for causing the action to be performed with respect to each of the identified class instances.

The present disclosure includes a number of important technical advantages. One technical advantage is the ability to present client management applications with a single consolidated CIM namespace thereby relieving the application from tasks related to discovering and working with namespace implementation details. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 3A and FIG. 3B consist of a flow diagram illustrating a method of managing objects in an information handling system.

DETAILED DESCRIPTION OF THE INVENTION

Preferred embodiments of the invention and its advantages are best understood by reference to FIG. 1 through FIG. 4 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
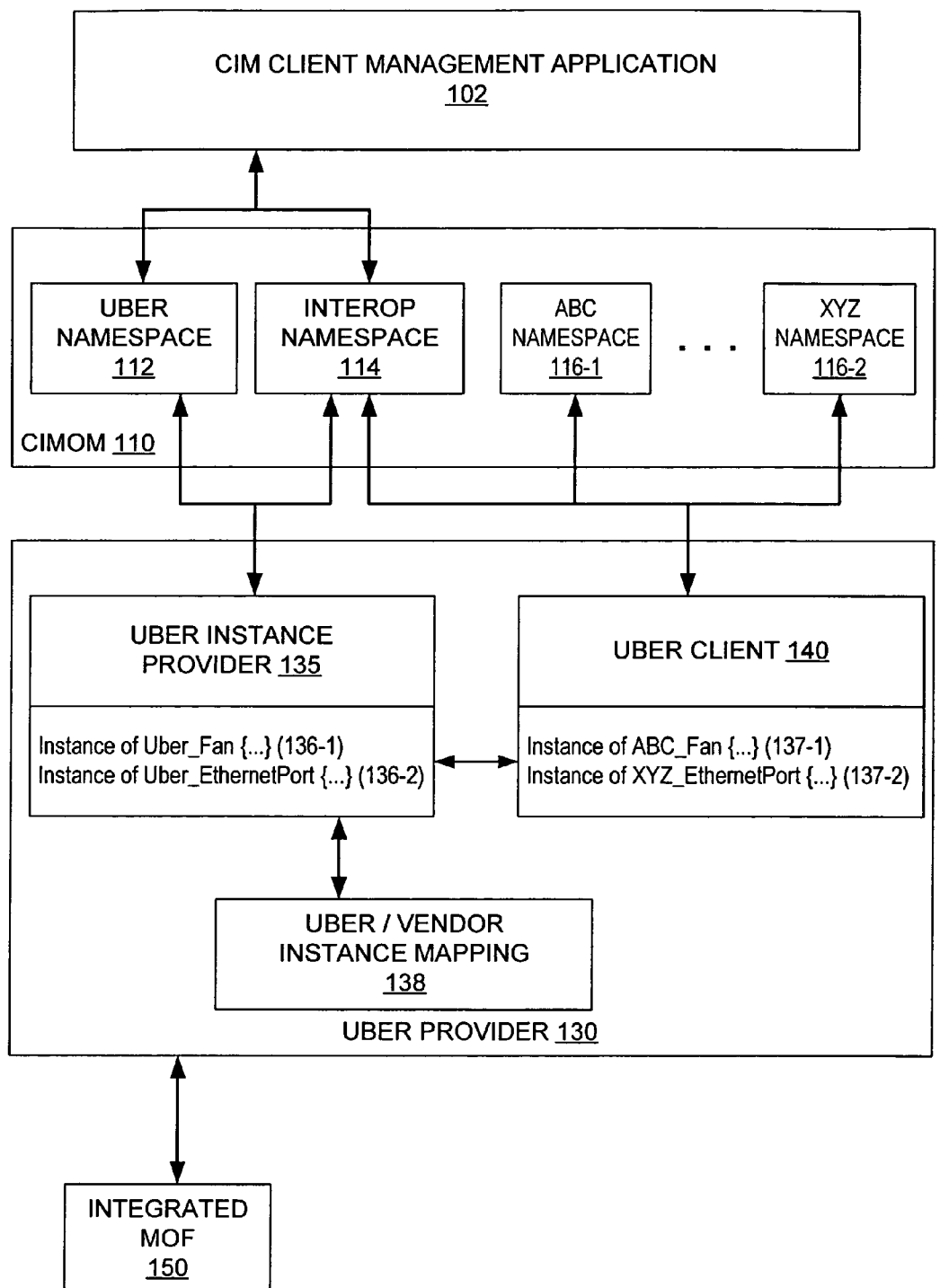
FIG. 1 is a block diagram of selected code elements of one embodiment of an information handling system.

FIG. 1 is a block diagram of selected elements of an information handling system 100 emphasizing aspects the system's management facilities. All or portions of at least some of the depicted elements may be implemented as a computer program products. For purposes of this disclosure, a computer program product is a set of computer executable instructions that are stored on a computer readable storage medium. In some embodiments, the computer program products collectively provide a CIM compliant management implementation for use in a multiple vendor and/or multiple namespace environment. The preferred implementation presents a single unified namespace to the client management application thereby freeing the client management application from tasks associated with discovering or traversing a details associated with a specific implementation.

FIG. 1 depicts an embodiment of information handling system 100 that includes a CIM compliant management application 102 and a CIM Object Manager (CIMOM) 110. The embodiment of information handling system 100 depicted in FIG. 1 emphasizes a multi-tenant CIMOM 110. A multi-tenant CIMOM refers to a CIMOM that integrates CIM providers from two or more vendors where each vendor implements its own CIM namespace.

Multi-tenant CIMOM's present an added layer of complexity to developers of client management applications. Ideally, client management applications are concerned with performing actions on managed objects. In a conventionally implemented multi-tenant CIMOM environment, however, the client management application must also concern itself with the specific management system implementation before it can perform requested actions.

Imagine, for example, that an administrator wishes to enumerate all of the fans on a particular system. In a conventional multi-tenant implementation, the client management application must first enumerate, discover, or otherwise identify all of the fan class instances instantiated in the vendor namespaces. Because there may be fan class instances in each vendor namespace and because client management application 102 cannot simultaneously take action with respect to class instances in different namespaces, management application 102 must include code and the associated performance overhead for discovering implementation details of the managed domain including the implemented namespaces and for cycling through each of the discovered namespaces to perform the requested action in each namespace.

CIMOM 110 as depicted in FIG. 1 is representative of a multi-tenant CIMOM supporting two or more vendor namespaces including ABC namespace 116-1 and XYZ namespace 116-2 (generically or collectively referred to herein as namespace(s) 116). Each vendor namespace 116 represents a namespace in which a CIM provider developed by or otherwise associated with a corresponding vendor registers and instantiates objects.

Information handling system 100 and CIMOM 110 as depicted in FIG. 1 include elements suitable for use in a multi-tenant namespace environment. These elements include a consolidating namespace identified as uber namespace 112 and an associated provider identified as uber provider 130. In the preferred implementation, uber namespace 112 is a consolidating namespace in which instantiated class instances are associated with class instances from the vendor namespaces.

As depicted in FIG. 1, for example, an uber client 135 of uber provider 140 has identified two class instances, namely, a fan class instance 137-1 from ABC vendor namespace 116-1 and an ethernetport class instance 137-2 in XYZ vendor namespace 116-2. An uber instance provider 135 of uber provider 130 is shown as having instantiated class instances including a fan class instance 136-1 and an ethernetport class instance 136-2. As suggested by their respective handles, uber_fan instance 136-1 and uber_ethernetport instance 136-2 are instantiated in uber namespace 112. Thus, uber provider 130 is operable to instantiate in uber namespace 112 an instance of a class corresponding to or otherwise associated with each instance of a class instantiated in one of the vendor namespaces 116.

In one embodiment, uber provider 130 creates and maintains a mapping 138 between the class instances in uber namespace 112 and the class instances in vendor namespaces 116. Mapping 138 enables uber provider 130 to process uber namespace requests from client management application 102 by identifying the appropriate class instances in vendor namespaces 116 and by routing the requested action to a vendor provider (not depicted) associated with each vendor namespace 116.

Uber namespace 112 thus provides a unified, client accessible namespace for consolidating instance data from multiple vendor namespaces 116. Consolidating instance data from different vendor namespaces 116 within uber namespace 112 frees client management application 102 from the burden of obtaining intimate knowledge of the system's object management implementation.

Uber provider 130 is an executable module that populates uber namespace classes with uber namespace class instances. Uber provider 130 includes an uber Instance Provider 135 and an uber Client 140. Uber Client 140 interacts with the vendor namespaces 116 to identify class instances in vendor namespaces 116. Uber Instance Provider 135 communicates with uber Client 140 to populate uber namespace 112 with "uber instances" of the vendor namespace class instances. An uber instance refers to a class instance in uber namespace 112 that serves as a proxy for or is otherwise associated with a class instance in one of the vendor namespaces 116.

In embodiments designed to conserve the amount of memory or storage required to implement a management model, the uber instances may be implemented as pointers to their associated instances in vendor namespaces 116. In other embodiments, the uber instances may fully or partially replicate the structure of the corresponding namespace instances (i.e., same data and methods).

With a consolidated namespace, client management application 102 is able to access a single namespace, namely, uber namespace 112, regardless of how many vendor namespaces are implemented in the management domain. This unification of namespace for multiple vendor implementations frees application developers from the need to determine namespace specifics about the implementation being managed and thereby allows the application develops to concentrate on management functionality, which is their core area of competence. The client application 102 as implemented in FIG. 1, for example, does not need to browse through the different vendor namespaces each time it wishes to perform an act.

Figure 2:
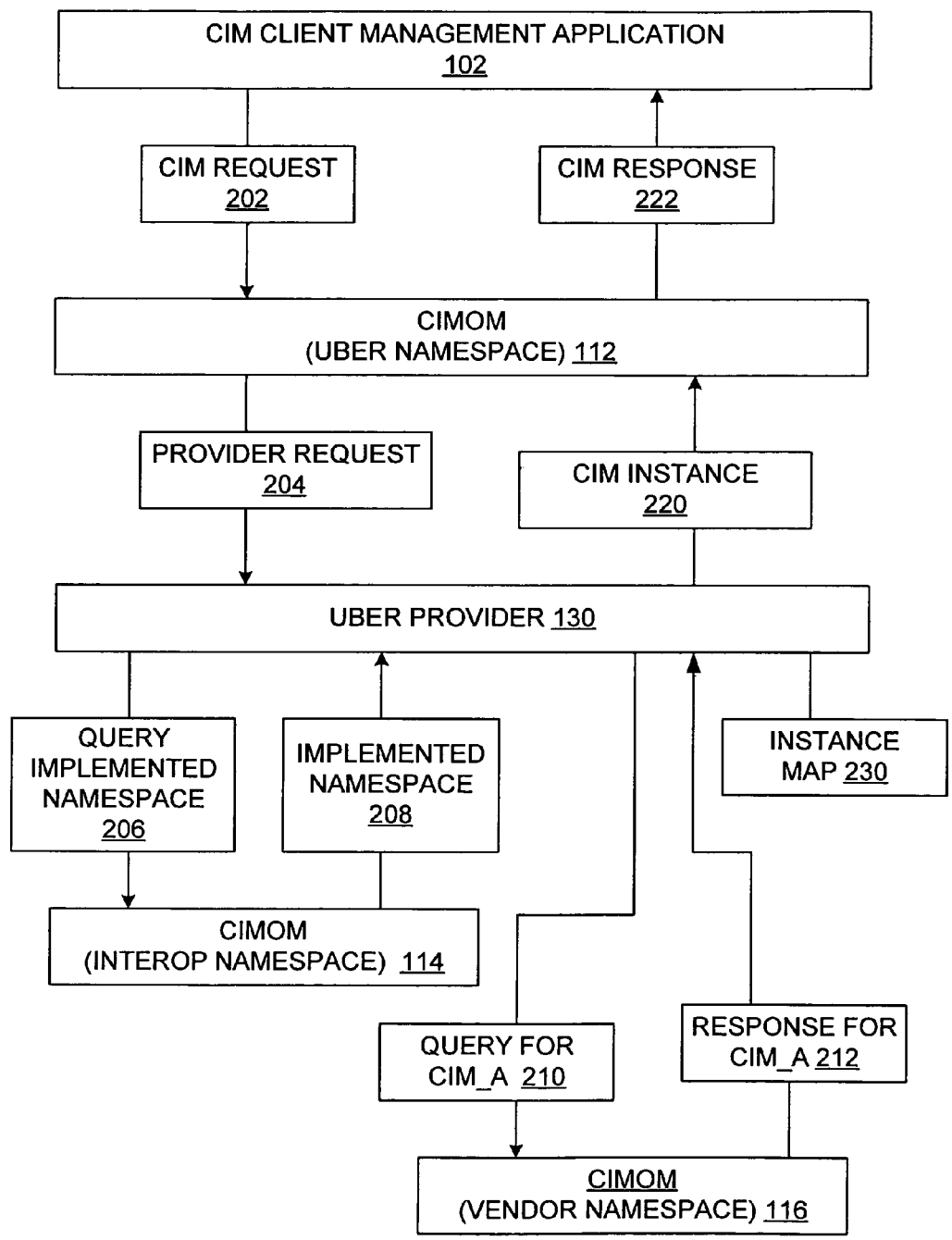
FIG. 2 is a conceptual depiction of the operation of the information handling system code elements depicted in FIG. 1.

Referring now to FIG. 2, a conceptual representation of the operation of information handling system 100 is depicted. Initially, client management application 102 issues a management request identified as CIM request 202. The depicted embodiment is described in the context of a CIM compliant management domain. The concept of providing a namespace for consolidating instances of managed objects in different may, however, extend to other implementations.

CIM request 202 preferably indicates an object and an action to be performed relative to the object. In perhaps the most common type of CIM request, the object indicated in the request is a CIM class object (e.g., a fan, I/O port, power supply, processor, operating system, rack enclosure, storage device, and so forth).

In an embodiment that employs the consolidated namespace concept in a multi-tenant environment, CIM request 202 is preferably formatted as a request directed to uber namespace 112. If, for example, CIM request 202 is a request to act on the CIM class fan, CIM request 202 would identify the object as uber:fan where uber indicates the namespace and fan indicates the class. Alternatively, client management application 102 may be developed specifically for use with a consolidated namespace implementation. In this case, client management application 102 may assume the consolidated namespace (uber in the described example) as the default namespace and omit inclusion of the namespace in each request.

As depicted in FIG. 2, CIM request 202 identifies uber namespace 112 and results in the generation of a provider request 204 that is received by uber provider 130. Provider request 204 may, in some embodiments, be substantially similar to CIM request 202. In other embodiments, uber namespace 112 may be responsible, as an example, for knowing the location or file path associated with uber provider 130. In this case, uber namespace 112 may redirect CIM request 202 as provider request 204 to uber provider 130.

Uber provider 130 responds to receiving provider request 204 by discovering and identifying vendor namespace class instances that correspond to the class identified in CIM request 202. Initially, uber namespace 112 may start out with no instantiated class instances and uber provider may have no knowledge of the vendor namespaces that are implemented in CIMOM 110. In these cases, uber provider responds to receipt of provider request 204 by first discovering the vendor namespaces and the class instances that are instantiated in those namespaces.

In the embodiment illustrated in FIG. 2, uber provider 130 discovers the implemented vendor namespaces by querying (block 206) interop namespace 114. Other techniques may be used to discover the implemented namespaces. For example, instances of the cross-namespace association CIM_ElementConformsToProfile (ECTP), which associates instances of CIM_RegisteredProfile with instances of central classes defined in that profile, can be inspected and the namespace where the instance of the central class resides can be extracted from the object reference defined in the ECTP association instance.

The interop namespace is a special purpose CIM namespace that identifies the other namespaces that are implemented in the CIMOM. Uber provider 130 may query interop namespace 114 for instances of a NAMESPACE class. Each NAMESPACE class instance includes a NAME property. The value of the NAME property in a NAMESPACE class instance identifies a namespace that is implemented in the CIMOM. Thus, as depicted in FIG. 1, interop namespace 114 includes at least two instances of the NAMESPACE class—a first instance having a NAME property value of ABC and a second instance having a NAME property value of XYZ.

Figure 4:
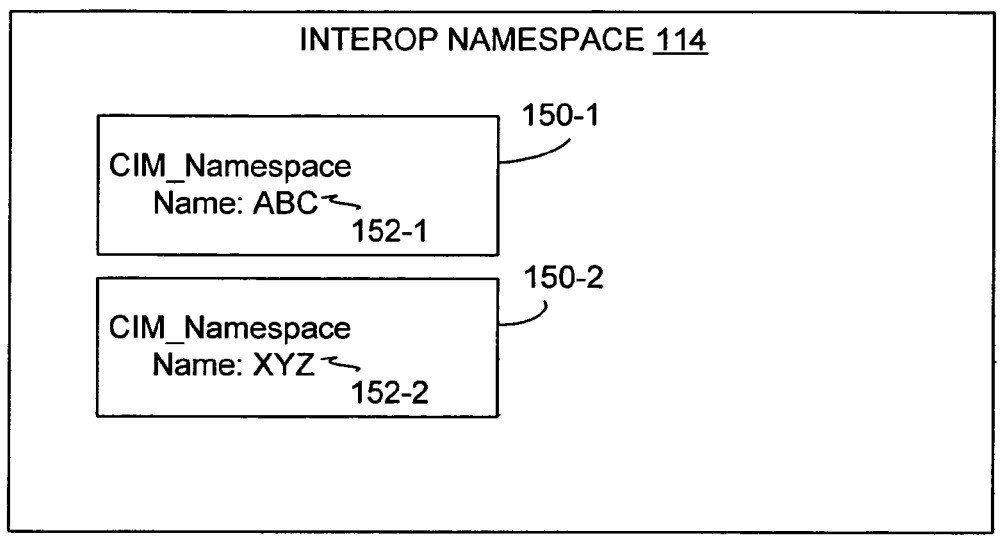
FIG. 4 is a block diagram of a representative interop namespace for use in the code elements of FIG. 1.

In an embodiment illustrated in FIG. 4, for example, Interop namespace 114 contains an instance of a CIM_namespace class 152 corresponding to each implemented vendor namespace 116 in CIMOM 110. With respect to CIMOM 110 as depicted in FIG. 1, Interop namespace 114 thus contains a first instance 150-1 of a CIM_namespace class containing a corresponding Name property 152-1 and a second instance 150-2 of the CIM_namespace claim containing a corresponding Name property 152-2. The value of Name property 152-1 in CIM_namespace class 150-1 is "ABC" corresponding to the ABC vendor namespace 116-1 implemented in CIMOM 110 while the value of Name property 152-2 in CIM_namespace class 152-1 is "XYZ" corresponding to the XYZ vendor namespace 116-2.

uber provider 130 and information handling system 100 preferably include the ability to store information locally such that, for example, uber provider 130 would be required to query the interop namespace only once, e.g. following a system reset, and then thereafter only when the CIMOM implementation changes.

As depicted in FIG. 2, the query 206 produces an implemented namespace response 208 that identifies the vendor namespaces to uber provider 130.

Upon receiving implemented namespace response 208, uber provider 130 then continues to service provider request 204 and CIM request 202 by identifying the instances of the class object identified in CIM request 202 that reside in the vendor namespaces. Thus, FIG. 2 depicts uber provider querying (block 210) a vendor namespace 116 for instances of the CIM_A class where CIM_A represents the class object identified in CIM request 202. The vendor namespace class 116 returns a response (block 212) that identifies all instances of CIM_A located in vendor namespace 116. Uber provider 130 repeats query 210 and response 212 for each implemented vendor namespace 116. In this manner, uber provider 130 systematically identifies all instances of a given class regardless of what namespace the class instance resides in.

Uber provider 130 also preferably creates local objects corresponding to each identified instance of a class and, in addition, uber provider 130 may create and maintain an instance map 230. Instance map 230 preferably includes a mapping between a class instance instantiated in one of the vendor namespaces 116 and the associated local object.

FIG. 2 depicts uber provider 130 generating a CIM instance 220 representing the action that is taken as specified in the original CIM request 202. In the case of an action in CIM data is merely read (e.g., an enumerate action), CIM instance 220 may include uber provider 130 populating uber namespace 112 with the instances of the corresponding class identified in block 212. In the case of an action that modifies CIM data, CIM instance 220 may include retrieving a mapping of the objects specified in the request and forwarding the action to the appropriate namespace using the information indicated in the request. Ultimately, a CIM response 222 is returned to client management application 102.

Figure 3A:
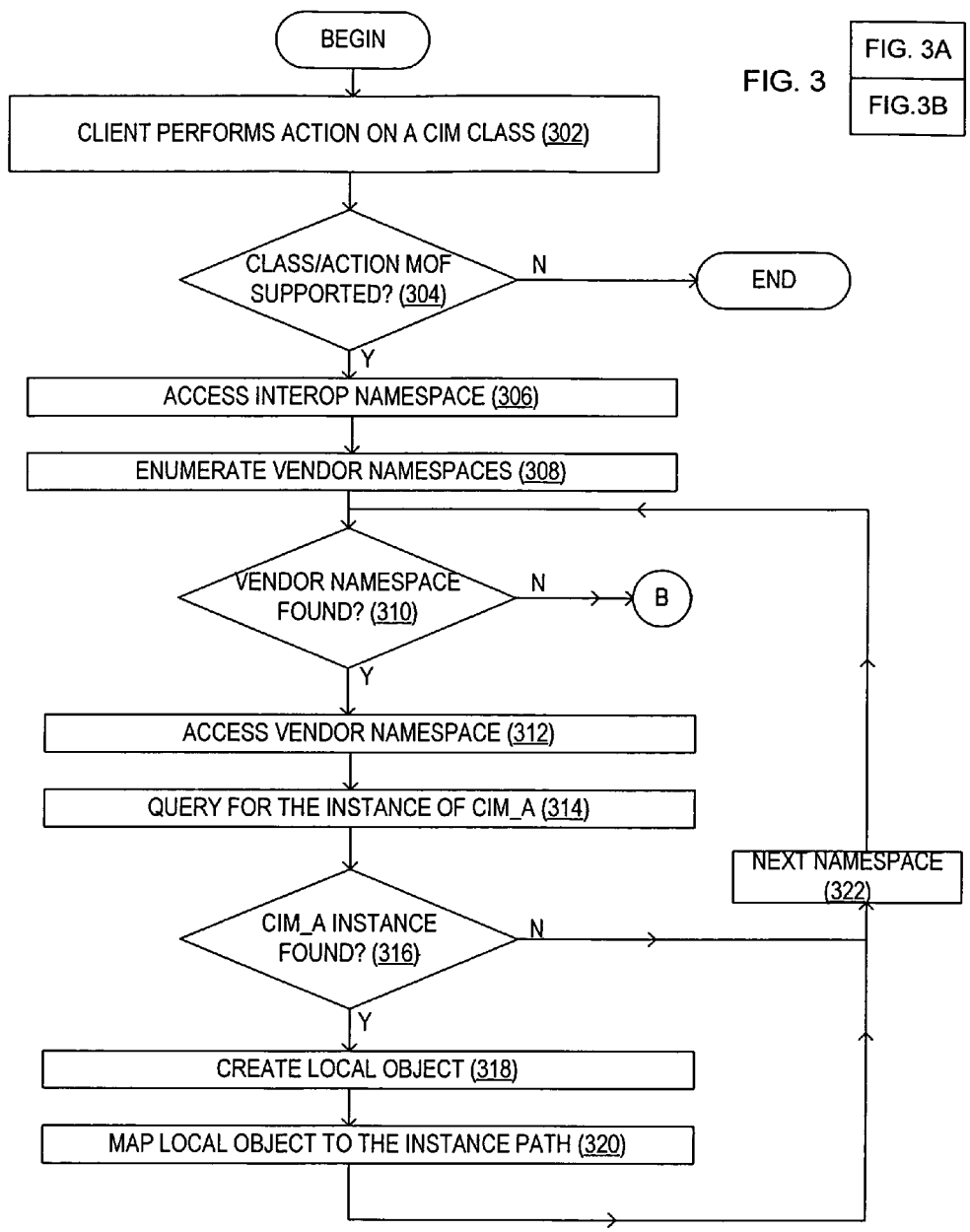

The conceptual depiction of the operation of information handling system 100 as depicted in FIG. 2 is illustrated as a method 300 in the flow diagram of FIG. 3, which consists of FIG. 3A and FIG. 3B. As depicted in FIG. 3, method 300 includes an initial or prerequisite process in which a client management application performs an action (block 302) on a CIM class object.

Method 300 includes first determining (block 304) whether the request is supported by a managed object file (MOF)

represented in FIG. 1 by reference numeral 150. If the class object or its specified action is not supported by MOF 150, an error condition is present and the client management application should abort.

When the object and action specified in the vendor request is supported by the MOF 150, method 300 as depicted includes accessing interop namespace 114 and enumerating the vendor namespaces as discussed above.

Having identified all of the vendor namespaces, method 300 includes performing a loop including blocks 312 to 322. The loop includes accessing (block 312) one of the previously identified vendor namespaces and querying (block 314) the vendor namespace for instances of the class specified in the CIM request. If (block 316) method 300 finds instances of the specified class, method 300 includes creating (block 318) a local object corresponding to each instance and mapping (block 320) the local objects to their corresponding instances in the vendor namespaces. This process is repeated for each vendor namespace so that, ultimately, local objects exist for all instances of a particular class. Method 300 then repeats the loop until all vendor namespaces have been queried for their class instances.

Having identified all vendor namespaces and all of the relevant class instances in the vendor namespaces, method 300 includes then determining the nature of the requested action. If (block 330) the action specified in the request is a write action such as a put or method execution action, method 300 includes retrieving (block 332) the mapping data in mapping data 150 and using the mapping data to route (block 334) the requested action to the appropriate namespace. Regardless of whether the action was a read action such as a get or enumerate action or a write action, method 300 includes populating (block 336) the uber namespace 112 with the locally created instances of the class object.

Although the disclosed embodiments have been described in detail, it should be understood that various changes, substitutions and alterations can be made to the embodiments without departing from their spirit and scope.

What is claimed is:

1. An information handling system including a processor, a system memory, and a storage medium, the storage medium including:
    an object manager, accessible to a client management application, the object manager including:
        a first set of class instances instantiated in a first vendor namespace;
        a second set of class instances instantiated in a second vendor namespace; and
        an uber set of class instances instantiated in an uber namespace, wherein a class instance in the uber set of class instances is associated with a vendor namespace class instance in one of the first or second sets of class instances; and
        an uber provider operable to instantiate objects in the uber namespace and query an interop namespace to identify the first vendor namespace and the second vendor namespace; and
    wherein the uber provider is further operable to service client management application requests directed to the uber namespace, each of the client management application requests indicating an action and a class, including (a) identifying instances of the class in the first and the second namespaces and (b) causing the action to be performed with respect to the indentified class instances in the first and second namespaces;
    wherein the uber provider is operable to create a set of local objects and associate each local object in the set of local objects with one of the identified instances of the class in the first and second namespaces.

2. The system of claim 1, wherein the object manager is a common information model (CIM) compliant object manager.

3. The system of claim 1, wherein causing the action to be performed includes populating the uber namespace with an instance corresponding to each local object in the set of local objects.

4. The system of claim 1, wherein the uber provider is further operable to maintain a mapping between each local object and its associated class instance in the first or second namespace.

5. The system of claim 4, wherein the action is a put action or a method execution action and further wherein the uber provider is operable to cause the action to be performed by using the mapping to route the action to each of the associated class instances in the first and second vendor namespaces.

6. A method of managing an information handling system comprising:
    providing an object manager, accessible to a client management application, the object manager including:
        a first set of class instances instantiated in a first vendor namespace;
        a second set of class instances instantiated in a second vendor namespace;
        an uber set of class instances instantiated in an uber namespace, wherein a class instance in the uber set of class instances is associated with a vendor namespace class instance in one of the first or second sets of class instances; and
        an uber provider operable to instantiate objects in the uber namespace and query an interop namespace to identify the first vendor namespace and the second vendor namespace;
    detecting a request of the client management application, wherein the request indicates an object comprising a class and an action and is directed to the uber namespace;
    identifying, by the uber provider, in the first vendor namespace and the second vendor namespace class instances corresponding to the object by identifying the first and second namespaces, by querying the first vendor namespace and the second vendor namespace for instances of the class, and by querying an interop namespace for instances of namespace class;
    causing, by the uber provider, the action to be performed with respect to each of the identified class instances by creating a local object corresponding to each identified class instance; and
    wherein said identifying further comprises populating the uber namespace with class instances corresponding to each of the local objects.

7. The method of claim 6, further comprising maintaining a mapping between each uber namespace class instance and its corresponding class instance in the first or second namespace.

8. The method of claim 7, wherein the action is a write action and further wherein said causing the action to be performed comprises using the mapping to route the action to each of the identified class instances in the first and second namespaces.

9. A computer program product comprising computer executable instructions, stored on a non-transitory computer readable medium, for managing an information handling system comprising:

at least one instruction for providing an object manager, accessible to a client management application, the object manager including:
- a first set of class instances instantiated in a first vendor namespace;
- a second set of class instances instantiated in a second vendor namespace;
- an uber set of class instances instantiated in an uber namespace, wherein a class instance in the uber set of class instances is associated with a vendor namespace class instance in one of the first or second sets of class instances; and
- an uber provider operable to instantiate objects in the uber namespace and query an interop namespace to identify the first vendor namespace and the second vendor namespace;

at least one instruction for detecting a request of the client management application, wherein the request indicates an object comprising a class and an action and is directed to the uber namespace;

at least one instruction for identifying, by the uber provider, in the first vendor namespace and the second vendor namespace class instances corresponding to the object, including at least one instruction for identifying the first and second namespaces, one instruction for querying the first vendor namespace and the second vendor namespace for instances of the class, and at least one instruction for querying an interop namespace for instances of namespace class;

at least one instruction for causing, by the uber provider, the action to be performed with respect to each of the identified class instances, including at least one instruction for creating a local object corresponding to each identified class instance; and wherein said at least one instruction for identifying further comprises at least one instruction for populating the uber namespace with class instances corresponding to each of the local objects.

10. The computer program product of claim 9, wherein said at least one instruction for identifying the first and second namespaces comprises at least one instruction for inspecting instances of CIM_ElementConformsToProfile (ECTP) associations to identify instances of CIM_RegisteredProfile and instances of central classes defined therein and to extract namespaces hosting the central class from object references defined in the ECTP association instance.

11. The computer program product of claim 9, further comprising maintaining a mapping between each uber namespace class instance and its corresponding class instance in the first or second namespace and wherein the action is a write action and further wherein said at least one instruction for causing the action to be performed comprises at least one instruction for using the mapping to route the action to each of the identified class instances in the first and second namespaces.

* * * * *